Nov. 12, 1968          A. J. ROSSI          3,410,230
TAFFY-PULLING MACHINE AND SYSTEM
Filed Dec. 23, 1966          2 Sheets-Sheet 1
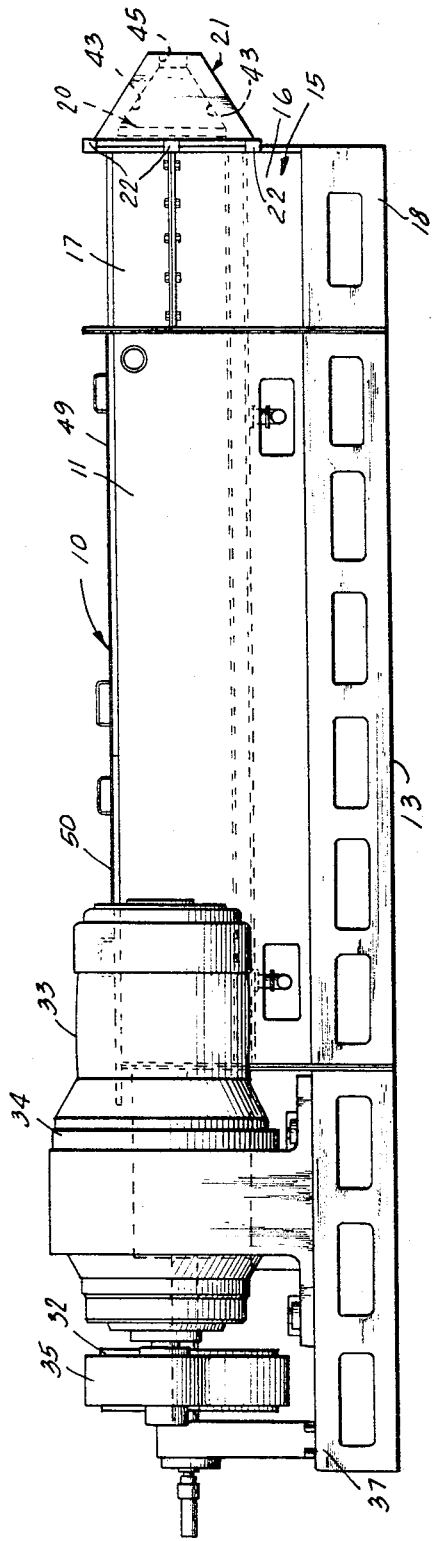
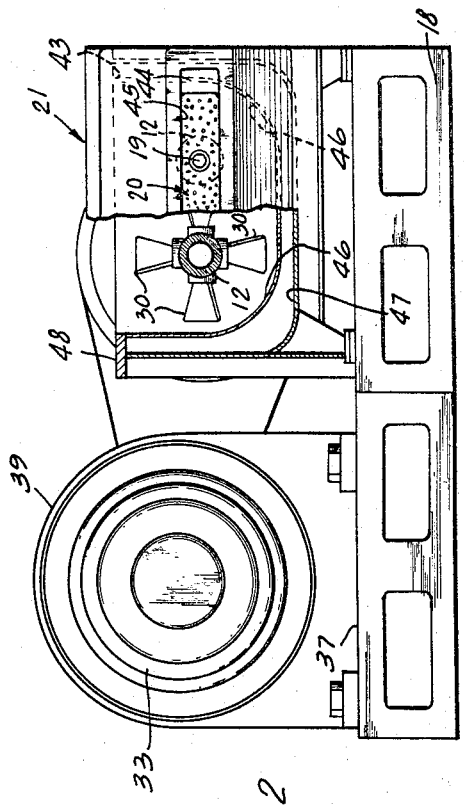
INVENTOR.
ANTHONY J. ROSSI
BY *[signature]*
ATTORNEYS Nov. 12, 1968  A. J. ROSSI  3,410,230
TAFFY-PULLING MACHINE AND SYSTEM
Filed Dec. 23, 1966  2 Sheets-Sheet 2
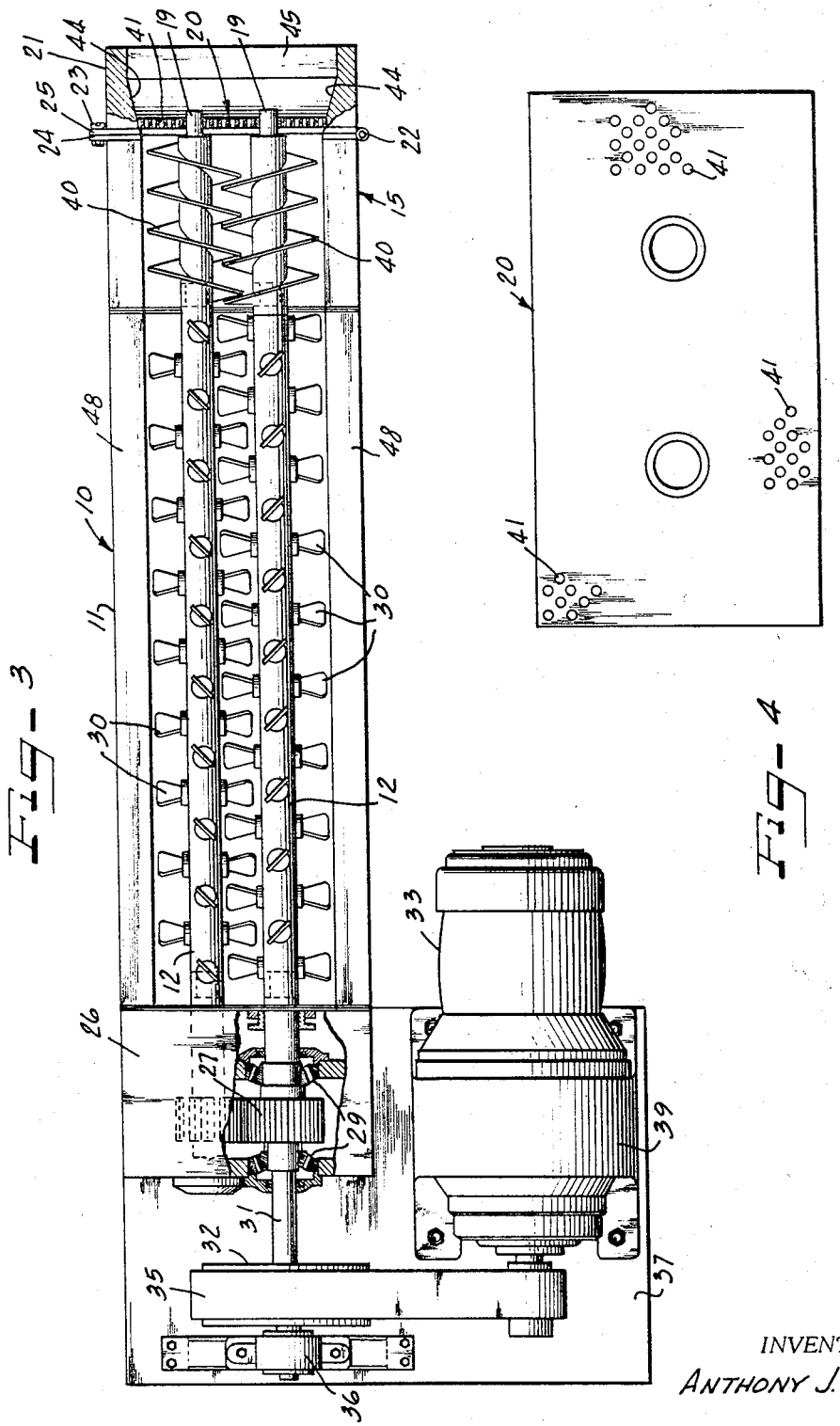
INVENTOR.
ANTHONY J. ROSSI
BY  ATTORNEYS United States Patent Office 3,410,230
Patented Nov. 12, 1968

3,410,230
TAFFY-PULLING MACHINE
AND SYSTEM
Anthony J. Rossi, 40 Kashey St., Clifton, N.J. 07013
Filed Dec. 23, 1966, Ser. No. 604,402
9 Claims. (Cl. 107—14)

ABSTRACT OF THE DISCLOSURE

A process and apparatus for graining a viscous taffy candy product by pulling the product and stabilizing the grain thereof and then forming the taffy to size, by utilizing the principles of the double shafted pug mill, which grains the taffy candy product by pulling the taffy and conveys the taffy along the trough of the pug mill as pulled. The grained product is then stabilized by extruding the product through a graining plate by the use of two oppositely pitched scrolls forming continuations of the pug mill paddles. The scrolls further extrude the grained and stabilized product to size through a diverging extruding nozzle where the product may be collected on a pan or conveyor or like collecting device.

Objects and summary of invention

A principal object of the present invention is to provide a new and improved system and apparatus for pulling and stabilizing the grain of taffy candy products and extruding the stabilized grained product to size in a continuous operation.

A further object of the invention is to improve upon the previous systems of pulling taffy candy products by pouring the product into a pug mill having oppositely rotating and pitched paddles effecting the pulling and graining of the product, and by utilizing oppositely pitched scrolls forming continuations of the paddles, to extrude the product, to stabilize the grained texture of the product and to form the product to size.

Still another object of the invention is to provide a novel and improved system enabling a taffy candy product to be pulled and extruded to size in a continuous operation, by pouring a taffy candy product into an elongated trough and graining the product by pulling and progressing the taffy candy product along the trough by oppositely rotating paddles moving in intersecting paths, and stabilizing the grain texture of the product by extruding the product through a graining plate by oppositely rotating scrolls moving in intersecting paths, which also provide the force to form the product to a preselected size.

Still another object of the invention is to improve upon the apparatus heretofore used in the pulling of taffy by providing a pair of shafts in a trough having paddles extending radially therefrom and pitched to effect a pulling operation on a taffy candy mixture and to progress the taffy candy mixture along the trough, in which oppositely rotating scrolls form continuations of the paddles and are arranged in advance of a graining plate to force the grained taffy therethrough and thereby stabilize the grained structure of the taffy and further extrude the taffy through a diverging nozzle, forming the taffy to a preselected size, for further processing.

These and other objects of the invention will appear from time to time as the following specification proceeds and with reference to the accompanying drawings wherein:

FIGURE 1 is a view in side elevation of a taffy pulling apparatus constructed in accordance with the principles of the present invention;

FIGURE 2 is an end view of the apparatus shown in FIGURE 1 looking at the apparatus toward the discharge end thereof with certain parts broken away and certain other parts shown in transverse section;

FIGURE 3 is a top plan view of the apparatus shown in FIGURES 1 and 2 with certain parts broken away and certain other parts shown in horizontal section; and FIGURE 4 is a fragmentary view of the graining plate, stabilizing the texture of the grained product.

In the embodiment of the invention illustrated in the drawings, I have shown a taffy pulling machine 10 in the general form of a pug mill and including an elongated trough 11 opening at its top and having a pair of parallel shafts 12, 12 extending therealong. The trough 11 is mounted on a base 13, mounted on a suitable foundation, bolted or otherwise secured to the floor. A split extruder housing 15 forms a forward continuation of the trough 11 and includes a lower trough section 16 and a top housing section 17 bolted or otherwise secured thereto. The split housing 15 is mounted on a base 18 like the base 13 and forming a forward continuation thereof.

The shafts 12 extend along the troughs 11 and 15 for the length thereof and have reduced end portions 19 rotatably mounted in a grain plate 20 extending across the inlet end of a converging extrusion nozzle 21. The extrusion nozzle 21 is hinged or otherwise secured to the forward end of the housing 15 on hinge members 22. Clamping screws 23, extending through flanges 24 and 25, extending outwardly of the housing 15, and the adjacent end of the extrusion nozzle 21, are provided to retain the extrusion nozzle 21 in its closed position.

The shafts 12, 12 may be aligned sectional shafts and are shown as extending rearwardly of the trough 11 into a gear housing 26, and journaled therein, on opposite sides of a pair of tying gearings 27, on spaced bearings 29, herein shown as being roller thrust bearings. The tying gears 27 time the shafts 12 to rotate at the same rates of speeds and in opposite directions to move vanes or paddles 30 extending radially of said shafts toward each other, as the paddles move downwardly along the center of the trough 11.

One shaft 12 has a reduced diameter drive end portion 31 extending rearwardly therefrom and having a drive pulley 32 thereon. The drive pulley 32 is driven from the motor 33 through a drive belt 35. The rear end of the drive end portion 31 of the shaft 12 is journaled in a journal box 36 mounted on a base 37 for the motor 33. The motor 33 may be a speed reducer type of motor, wherein a speed reducer gear housing 39 is attached to and forms a part of the motor housing and contains speed reducer gearing (not shown) therein, for driving the drive belt 35 at the required speed.

The paddles 30, 30 driven in opposite directions in contiguous paths by the motor 33 are also mounted on the respective shafts 12 in interdigitating relation with respect to each other and are oppositely pitched, with the pulling and impelling faces thereof arranged in helical planes to progress the taffy candy product along the trough 11 while graining the taffy candy product by pulling the product. The portions of the shafts 12, 12 extending along the housing 15 have oppositely pitched scrolls 40, 40 thereon, extruding the taffy candy product through the graining plate 20, to stabilize the texture of the grained texture of the product.

The paddles may be adjusted at various helix angles with respect to the shafts 12, to vary the holding time required to grain a particular taffy product in accordance with the formula of the product. Such changes in the formula governing the holding time, may be the sugar-corn syrup ratio, the amount of invert as well as the solids content of the final product. The temperature of the product also may determine the holding time of the product.

A 45° helix angle has been found to be very satisfactory for most taffy candy products although the helix angle may be greater than 45° and also may be as low as 10°.

The graining plate 20 is shown in FIGURE 3 as mounted at the inlet side of the extruding nozzle 21 and as having a plurality of uniformly spaced holes 41 leading therethrough, throughout the area thereof, through which the grained taffy is extruded by the scrolls 40, 40, to effect the stabilizing of the texture of the product, the texture of which has been grained by the pulling operation thereon, effected by the paddles 30, 30. The extruding scrolls 40, 40 by extruding the product through the holes 41, 41 in the graining plate 20, also force the product to form through the nozzle 21.

The nozzle 21 has converging top and bottom walls 43, 43 joined together by diverging side walls 44, 44. The converging walls 43, 43 converge to an elongated generally rectangular nozzle opening 45, forming the grained textured product to a slab-like form, and directing the product to a conveyor or pan, or like apparatus (not shown) for further processing.

The trough 11 is shown as having lower side portions 46, 46 conforming generally to the paths of travel of the paddles 30, 30 on each shaft 12, 12 and joining along a flat bottom extending along the center of the trough. The trough 11 also has an outer housing portion 47 extending therealong and spaced outwardly therefrom to form a jacket for steam or other heat transfer mediums for maintaining the temperature within the trough 11 to a predetermined required temperature. The shafts 12, 12 may also have steam or another heat transfer medium passed therethrough. Flanges 48 extend laterally from the trough 11 and close the space between said trough and the housing or jacket 47, and also form a support for cover plates 49 and 50, closing the top of the trough.

In carrying out the taffy pulling graining and extruding process, a heavy taffy candy mixture having less than 8% moisture is deposited at the inlet end of the pug mill, by opening the cover 50. As the taffy candy product is deposited into the plug mill, the paddles 30, 30 are rotating toward each other toward the center of the machine and downwardly to the center of the trough 11 at a relatively slow rate of speed, which may be from 10 to 13 revolutions per minute. This effects a pulling and progression of the product along the trough 11 to the extruding scrolls 40, 40, it being understood that the product may be continuously poured into the pug mill and reach a point where the taffy candy product extends for the length of the pug mill and the extruder housing 17.

The rotating paddles 30, 30 exert a taffy pulling action on the product as they progress the product to the extruding scrolls 40, 40 and thereby grain the texture of the product in a controlled manner. The product is then forced through the graining plate 20 by the oppositely rotating interdigitating scrolls, to stabilize the texture of the product grained by the operation of pulling and progressing the taffy along the trough 11 by the oppositely rotating paddles 30, 30. The oppositely rotating scrolls 40, 40 extruding the product through the graining plate further force the product along the converging walls 43, 43 of the nozzle 21 through the elongated nozzle opening 45 thereof, extruding the product to a flat form for further processing.

It may be seen from the foregoing that a controlled system and apparatus has been provided for pulling taffy by graining and stabilizing the texture of the grained product in a continuous operation, by utilizing the pug mill principle for pulling the taffy and by utilizing oppositely pitched scrolls coaxial continuations thereof, for extruding the product through a graining plate and then forming the product for further processing.

It may further be seen that the operation is a simple and continuous operation performed along a single level and may continue as long as the taffy candy product is poured into the trough 11.

It may still further be seen that the graining plate and the hinged nozzle are readily accessible for cleaning or replacement by the simple operation of moving the nozzle to an open position.

While I have herein shown and described one form in which the invention may be embodied, it may readily be understood that various variations and modifications in the invention may be attained without departing from the spirit and scope of the novel concepts thereof.

I claim as my invention:

1. A method of pulling a candy product, such as taffy, and stabilizing the grained structure of the product and forming the product to size comprising the steps of:

supplying a cooked candy product of a relatively dry viscous nature, graining the texture of the product by pulling and progressing the product along a confined area by acting on the product with oppositely rotatable helical motions throughout the entire volume of the product and moving towards the center of the product, then graining the product by performing an extruding operation on the product to stabilize the texture of the grained texture of the product, and then forming the grained product to a preselected shape.

2. The method of claim 1, wherein the texture of the product is stabilized by extruding the product through a graining plate, in which the product is formed to shape by forcing the product through a forming nozzle after the graining operation.

3. The method of claim 1, wherein the product is progressed along the confined area by oppositely rotating helically disposed paddles, and wherein the product is grained by forcing the product through a graining plate by oppositely pitched scrolls, forming continuations of the helically arranged paddles.

4. The method of claim 3, wherein the grained product is formed to size by forcing the product along a forming nozzle downstream of the graining operation.

5. A machine for pulling candy products, such as taffy and the like comprising, an elongated trough having a receiving end and a discharge end, two oppositely rotating parallel shafts mounted in said trough and extending therealong, a motor, a drive connection from said motor to said shafts for rotatably driving said shafts to move downwardly toward each other when approaching the center of said trough at relatively low rates of speed, a series of candy product pulling paddles extending radially of said shafts and inclined with respect to the axes of rotation of said shafts and oppositely pitched and moving in interdigitating paths to effect a pulling operation on the heavy viscous candy product and to progress the product along said trough toward the discharge end thereof and effect a graining of the texture of the product by the pulling operation thereon, a graining plate extending across said trough in advance of said paddles, oppositely pitched scrolls on said shaft, forming continuations of said paddles and extruding the product through said graining plate to stabilize the grained texture thereof, and a nozzle extending forwardly of said graining plate and having converging top and bottom walls and a generally rectangular nozzle opening and forming the stabilized grained product to shape.

6. The structure of claim 5, wherein the nozzle is a hinged nozzle, hinged to the forward end of said trough and extending in advance thereof and forms a support for said graining plate and affords access thereto for cleaning or renewal.

7. The structure of claim 6, wherein the hinged nozzle has converging top and bottom walls and diverging side walls terminating into an elongated rectangular nozzle opening.

8. The structure of claim 7,
wherein the drive from said motor includes timing gears connecting said shafts to rotate together at the same rates of speed, and
wherein the drive connection from said motor to said shafts is a reduction drive connection driving said shafts at relatively slow rates of speed in the range of between 10 and 15 revolutions per minute.

9. The structure of claim 5,
wherein the paddles are adjustable to vary the pitch thereof and the holding time to grain a particular candy product.

References Cited
UNITED STATES PATENTS

| | | | |
|---|---|---|---|
| 1,744,591 | 1/1930 | Taurel | 107—14 |
| 1,777,294 | 10/1930 | Dellenbarger | 259—6 |
| 2,584,225 | 2/1952 | Plunguian | 259—6 |
| 2,991,503 | 7/1961 | Rietz | 107—14 |

ROBERT W. JENKINS, *Primary Examiner.*